(12) United States Patent
Zhou et al.

(10) Patent No.: US 12,738,593 B2
(45) **Date of Patent: *Sep. 15, 2026**

(54) END CAP, BATTERY CELL, BATTERY AND POWER CONSUMING DEVICE

(71) Applicant: CONTEMPORARY AMPEREX TECHNOLOGY (HONG kONG) LIMITED, Hong Kong (CN)

(72) Inventors: Wenlin Zhou, Ningde (CN); Shengwang Chen, Ningde (CN); Quankun Li, Ningde (CN); Peng Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 481 days.

This patent is subject to a terminal disclaimer.

(21) Appl. No.: 18/225,685

(22) Filed: Jul. 25, 2023

(65) Prior Publication Data

US 2024/0120608 A1 Apr. 11, 2024

Related U.S. Application Data

(63) Continuation of application No. PCT/CN2022/093132, filed on May 16, 2022.

(51) Int. Cl.
*H01M 50/342* (2021.01)
*H01M 50/103* (2021.01)
(Continued)

(52) U.S. Cl.
CPC ..... *H01M 50/3425* (2021.01); *H01M 50/103* (2021.01); *H01M 50/14* (2021.01);
(Continued)

(58) Field of Classification Search
CPC .......... H01M 50/342; H01M 50/3425; H01M 50/103; H01M 50/271; H01M 50/15; H01M 50/55; H01M 50/249; H01M 2220/20
See application file for complete search history.

(56) References Cited

U.S. PATENT DOCUMENTS

2012/0088128 A1* 4/2012 Matsuura .......... H01M 50/3425 429/56
2014/0220395 A1 8/2014 Ootsuka
(Continued)

FOREIGN PATENT DOCUMENTS

CN 202395055 U 8/2012
CN 102804449 A 11/2012
(Continued)

OTHER PUBLICATIONS

Machine translation of Yoshida JP-2011175937-A (Year: 2011).*
(Continued)

*Primary Examiner* — Gregg Cantelmo
*Assistant Examiner* — Julia Marie Fehr
(74) *Attorney, Agent, or Firm* — XSENSUS LLP

(57) ABSTRACT

Embodiments of the present application provide an end cap, a battery cell, a battery and a power consuming device, which relate to the technical field of batteries. The end cap may include a cap body and a groove. The cap body may have a first surface. The groove may be provided in the cap body to form a pressure relief zone in a region of the cap body where the groove is provided. The groove may be recessed from the first surface in a thickness direction of the cap body, and groove side faces of the groove may include corner faces at corners of the groove. Each corner face may be connected to the first surface via a first chamfer face.

20 Claims, 5 Drawing Sheets

(51) Int. Cl.

| | |
|---|---|
| ***H01M 50/14*** | (2021.01) |
| ***H01M 50/147*** | (2021.01) |
| ***H01M 50/15*** | (2021.01) |
| ***H01M 50/249*** | (2021.01) |
| ***H01M 50/271*** | (2021.01) |
| ***H01M 50/55*** | (2021.01) |

(52) U.S. Cl.

CPC ......... *H01M 50/147* (2021.01); *H01M 50/15* (2021.01); *H01M 50/249* (2021.01); *H01M 50/271* (2021.01); *H01M 50/55* (2021.01); *H01M 2220/20* (2013.01)

(56) References Cited

U.S. PATENT DOCUMENTS

| | | | | |
|---|---|---|---|---|
| 2014/0315050 | A1 | 10/2014 | Li et al. | |
| 2015/0311488 | A1* | 10/2015 | Ootsuka .............. | H01M 50/159 429/56 |
| 2018/0366716 | A1* | 12/2018 | Gong .................. | H01M 50/578 |
| 2020/0227715 | A1* | 7/2020 | Koo .................... | H01M 50/169 |
| 2021/0391626 | A1 | 12/2021 | Ma et al. | |
| 2022/0013848 | A1 | 1/2022 | Zeng et al. | |
| 2023/0344068 | A1 | 10/2023 | Zhou et al. | |

FOREIGN PATENT DOCUMENTS

| | | | | | |
|---|---|---|---|---|---|
| CN | 103427059 | A | | 12/2013 | |
| CN | 104871340 | A | | 8/2015 | |
| CN | 109216638 | A | | 1/2019 | |
| CN | 109686896 | A | | 4/2019 | |
| CN | 213304257 | U | | 5/2021 | |
| CN | 109037546 | B | | 7/2021 | |
| CN | 113270962 | A | | 8/2021 | |
| CN | 215496871 | U | | 1/2022 | |
| CN | 114006124 | A | * | 2/2022 | .......... H01M 50/367 |
| CN | 215911484 | U | * | 2/2022 | |
| CN | 216288669 | U | | 4/2022 | |
| CN | 217507493 | U | | 9/2022 | |
| CN | 117616622 | A | | 2/2024 | |
| EP | 3694013 | A1 | * | 8/2020 | ............ H01M 50/50 |
| JP | 2011175937 | A | * | 9/2011 | |
| JP | 2012-059496 | A | | 3/2012 | |
| WO | 2021/181893 | A1 | | 9/2021 | |

OTHER PUBLICATIONS

Li, James; First Mold; Chamfers In Product Design—Product Design Series, https://firstmold.com/tips/fillets-and-chamfers/, published May 28, 2024. (Year: 2024).*

Machine translation of Wang CN-215911484-U (Year: 2002).*

Machine translation of Li CN-114006124-A (Year: 2022).*

Extended European Search Report issued Jul. 1, 2024 in European Patent Application No. 22940493.4.

Extended European Search Report issued Jun. 4, 2025 in European Patent Application No. 22942484.1.

Notification to Grant Right to Utility Model issued Aug. 4, 2022 in Chinese Utility Model Application No. 202221172173.8 with machine English translation.

International Search Report issued Jan. 18, 2023 in International Patent Application No. PCT/CN2022/093132 with machine English translation.

Written Opinion issued Jan. 18, 2023 in International Patent Application No. PCT/CN2022/093132 with machine English translation.

International Search Report issued Feb. 21, 2023 in International Patent Application No. PCT/CN2022/137556 with machine English translation.

Written Opinion issued Feb. 21, 2023 in International Patent Application No. PCT/CN2022/137556 with machine English translation.

Office Action issued Apr. 22, 2026 in Chinese Patent Application No. 202280006883.X with English translation thereof.

* cited by examiner

END CAP, BATTERY CELL, BATTERY AND POWER CONSUMING DEVICE

CROSS-REFERENCE TO RELATED APPLICATION

The present application is a continuation of International Application No. PCT/CN2022/093132, filed May 16, 2022, which is incorporated herein by reference in its entirety.

TECHNICAL FIELD

The present application relates to the technical field of batteries, and in particular to an end cap, a battery cell, a battery and a power consuming device.

BACKGROUND ART

With the development of new energy technologies, the application of batteries is becoming more and more extensive. For example, the batteries are widely used in mobile phones, notebook computers, electric mopeds, electric vehicles, electric aircrafts, electric ships, electric toy cars, electric toy ships, electric toy aircrafts, electric tools, etc.

In the battery technology, it is not only necessary to consider the safety of a battery cell, but also the service life of the battery cell, and the impact resistance of an end cap directly affects the service life of the battery cell. Therefore, how to improve the impact resistance of the end cap is an urgent problem to be solved in battery technology.

SUMMARY OF THE DISCLOSURE

Embodiments of the present application provide an end cap, a battery cell, a battery and a power consuming device, which can effectively improve the impact resistance of the end cap.

In a first aspect, the embodiments of the present application provide an end cap, comprising a cap body and a groove. The cap body has a first surface. The groove is provided in the cap body to form a pressure relief zone in a region of the cap body where the groove is provided. The groove is recessed from the first surface in a thickness direction of the cap body, and groove side faces of the groove comprise corner faces at corners of the groove. Each corner face is connected to the first surface via a first chamfer face.

In the above technical solution, each corner face is connected to the first surface via a first chamfer face, and the provision of the first chamfer face weakens the strength of the pressure relief zone at the corner of the groove, equalizes the strength of the pressure relief zone at the corner and an edge of the groove, and reduces the risk of local stress concentration in the pressure relief zone, so that the pressure relief zone can be well protected, improving the impact resistance of the end cap.

In some embodiments, in a circumferential direction of the groove, the first chamfer face has a radius gradually increasing from two ends to the middle. Such a structure makes the strength of the pressure relief zone at the corner of the groove gradually increase from the middle to the two ends of the first chamfer face.

In some embodiments, the maximum radius of the first chamfer face is $R_1$, which satisfies: 0.5 mm≤$R_1$≤2 mm.

In some embodiments, the groove side faces further comprise a first side face connected to the corner face, the first side face being connected to the first surface via a second chamfer face; wherein the maximum radius of the second chamfer face is smaller than that of the first chamfer face. The provision of the second chamfer face enables the first side face to transition to the first surface more smoothly, preventing the first side face from being directly connected to the first surface to form a sharp angle. The maximum radius of the second chamfer face being less than that of the first chamfer face enables the strength of the pressure relief zone at the corner and the edge of the groove to be equalized.

In some embodiments, in the circumferential direction of the groove, two ends of the second chamfer face are connected to the first chamfer faces, and the second chamfer face has a radius gradually decreasing from the two ends to the middle. Such a structure makes the strength of the pressure relief zone at the edge of the groove gradually increase from the two ends to the middle of the second chamfer face, enhancing the strength of the pressure relief zone at the middle of the edge of the groove, and providing a better impact resistance.

In some embodiments, the first chamfer face is connected to the second chamfer face at a first connection position, and the radius of the first chamfer face at the first connection position is equal to that of the second chamfer face at the first connection position. Such a structure enables the first chamfer face to transition the second chamfer face more gently, so that the first chamfer face and the second chamfer face can form a continuous chamfer face.

In some embodiments, the maximum radius of the second chamfer face is $R_2$, which satisfies: 0.1 mm≤$R_2$≤0.5 mm.

In some embodiments, the groove side faces further comprise a second side face, the second side face and the first side face are located in different orientations of the groove, the second side face is connected to the first side face via the corner face, and the second side face is connected to the first surface via a third chamfer face; wherein the maximum radius of the third chamfer face is smaller than that of the first chamfer face. The provision of the third chamfer face enables the second side face to transition to the first surface more smoothly, preventing the second side face from being directly connected to the first surface to form a sharp angle. The maximum radius of the third chamfer face being less than that of the first chamfer face enables the strength of the pressure relief zone at the corner and the edge of the groove to be equalized.

In some embodiments, in the circumferential direction of the groove, two ends of the third chamfer face are connected to the first chamfer faces, and the third chamfer face has a radius gradually decreasing from the two ends to the middle. Such a structure makes the strength of the pressure relief zone at the edge of the groove gradually increase from the two ends to the middle of the third chamfer face, enhancing the strength of the pressure relief zone at the middle of the edge of the groove, and providing a better impact resistance.

In some embodiments, the first chamfer face is connected to the third chamfer face at a second connection position, and the radius of the first chamfer face at the second connection position is equal to that of the third chamfer face at the second connection position. Such a structure enables the first chamfer face to transition the third chamfer face more gently, so that the first chamfer face and the third chamfer face can form a continuous chamfer face.

In some embodiments, the maximum radius of the third chamfer face is $R_3$, which satisfies: 0.1 mm≤$R_3$≤0.5 mm.

In some embodiments, the groove side faces comprise two first side faces and two second side faces, the two first side faces are arranged opposite each other in a first direction, and the two second side faces are arranged opposite each other in a second direction, the first direction being perpendicular to the second direction. In this way, the two first side faces and the two second side faces are located in different orientations, so that the groove is substantially rectangular, and the structure is simple and easy to form.

In some embodiments, a distance between the two first side faces in the first direction is a first distance, and a distance between the two second side faces in the second direction is a second distance, the first distance being less than the second distance. In this way, the groove is substantially rectangular, and the pressure relief zone is also substantially rectangular, providing a relatively large pressure relief area.

In some embodiments, the first direction is a length direction of the cap body, and the second direction is a width direction of the cap body. The pressure relief zone is more likely to be damaged at the short edge of the groove when the inner side of the end cap is subjected to the pressure inside the battery cell, and the pressure relief zone is more likely to be damaged at the long edge of the groove when the outer side of the end cap is subjected to an impact force, so that the pressure relief zone is likely to be damaged in different positions under two different working conditions, increasing the impact resistance of the end cap and prolonging the service life of the battery cell.

In some embodiments, the cap body is provided with a pressure relief indentation located in the pressure relief zone. The region of the cap body where the pressure relief indentation is provided is weaker, so that the pressure relief zone is split at the position where the pressure relief indentation is provided when the pressure inside the battery cell reaches an explosion pressure, so as to release the pressure from the pressure relief zone.

In some embodiments, the pressure relief indentation is a closed groove extending along an end-to-end closed trajectory. Such a structure enables the pressure relief zone to open in the region defined by the pressure relief indentation when the pressure inside the battery cell reaches the explosion pressure, providing a relatively large pressure relief area and improving the pressure relief efficiency.

In some embodiments, the end cap further comprises a protective member, wherein the protective member is connected to the cap body and covers the groove. The protective member covers the groove, and the protective member protects the pressure relief zone, reducing the risk of damage to the pressure relief zone by foreign objects.

In some embodiments, the protective member is connected to the first surface. Such a structure enables the protective member to be mounted more conveniently. Moreover, the protective member can cover each chamfer face, so as to better protect the pressure relief zone.

In some embodiments, the cap body is provided with an exhaust passage which is in communication with the inside of the groove and the outside of the cap body. The provision of the exhaust passage makes the inside of the groove communicate with the outside, so as to balance the air pressure inside the groove and the outside, and reduce the risk of the protective member falling off due to the increase of the air pressure inside the groove.

In some embodiments, the exhaust passage is an exhaust groove provided in the cap body, the exhaust groove penetrating the first surface. The exhaust passage of such a structure can effectively communicate the inside of the groove with the outside, and is easy to form.

In a second aspect, embodiments of the present application provide a battery cell, comprising a housing and an end cap provided in any one of the embodiments in the first aspect. The housing is provided with an opening; and the cap body closes the opening.

In a third aspect, the embodiments of the present application provide a battery, comprising a case and a battery cell provided in any one of the embodiments in the second aspect, wherein the battery cell is received in the case.

In some embodiments, the case has a bottom wall, and the end cap is arranged on the side of the battery cell facing the bottom wall.

In a fourth aspect, the embodiments of the present application further provide a power consuming device, comprising a battery provided in any one of the embodiments of the third aspect.

BRIEF DESCRIPTION OF THE DRAWINGS

In order to more clearly describe the technical solutions of the embodiments of the present application, the accompanying drawings required in the embodiments will be described briefly below. It should be understood that the following accompanying drawings illustrate only some embodiments of the present application and therefore should not be construed as a limitation on the scope thereof. For those of ordinary skill in the art, other relevant accompanying drawings can also be obtained from these accompanying drawings without any creative effort.

Figure 1:
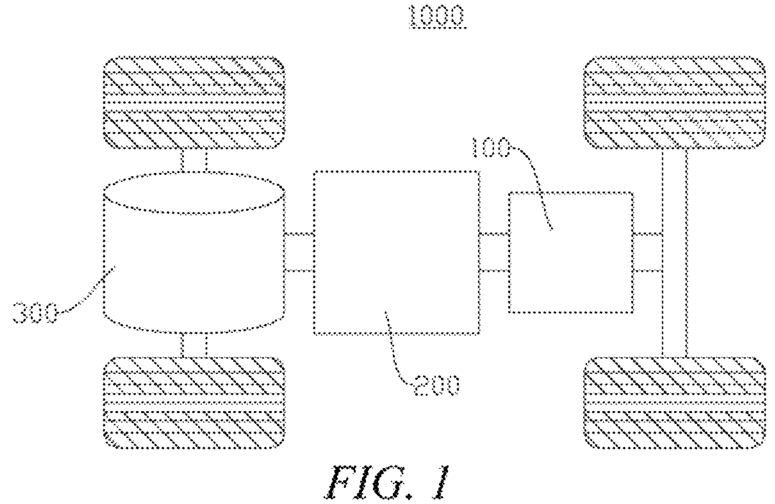
FIG. 1 is a schematic structural diagram of a vehicle provided in some embodiments of the present application.

List of reference signs: 1—Housing; 2—Electrode assembly; 21—Positive tab; 22—Negative tab; 3—End cap; 31—Cap body; 311—Boss; 3111—First surface; 312—Pressure relief zone; 313—Pressure relief indentation; 314—Exhaust passage; 32—Groove; 321—Corner face; 322—First chamfer face; 323—First side face; 324—Second chamfer face; 325—Second side face; 326—Third chamfer face; 33—Protective member; 4—Electrode terminal; 4*a*—Positive electrode terminal; 4*b*—Negative electrode terminal; 5—Current collecting member; 10—Battery cell; 20—Case; 201—First part; 202—Second part; 100—Battery; 200—Controller; 300—Motor; 1000—Vehicle; a—First connection position; b—Second connection position; X—First direction; Y—Second direction; Z—Thickness direction.

DETAILED DESCRIPTION OF EMBODIMENTS

In order to make the objectives, technical solutions and advantages of the embodiments of the present application clearer, the technical solutions in the embodiments of the present application will be described clearly below with reference to the drawings in the embodiments of the present application. Obviously, the embodiments described are some of, rather than all of, the embodiments of the present application. All the other embodiments obtained by those of ordinary skill in the art based on the embodiments of the present application without any creative effort shall fall within the scope of protection of the present application.

Unless otherwise defined, all technical and scientific terms used in the present application have the same meanings as those commonly understood by those skilled in the art to which the present application belongs; The terms used in the description of the present application are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion. The terms "first", "second", etc. in the description and the claims of the present application as well as the foregoing accompanying drawings are used to distinguish between different objects, rather than describing a specific order or a primary-secondary relationship.

In the present application, "embodiment" mentioned means that the specific features, structures and characteristics described in conjunction with the embodiments may be included in at least one embodiment of the present application. The phrase at various locations in the description does not necessarily refer to the same embodiment, or an independent or alternative embodiment exclusive of another embodiment.

In the description of the present application, it should be noted that, the terms "mount", "connected", "connect", or "attach" should be interpreted in a broad sense unless explicitly defined and limited otherwise. For example, they may be a fixed connection, a detachable connection, or an integral connection; or may be a direct connection, an indirect connection by means of an intermediate medium, or internal communication between two elements. For those of ordinary skills in the art, the specific meaning of the foregoing terms in the present application may be understood according to specific circumstances.

The term "and/or" in the present application is merely a description of the associated relationship of associated objects, representing that three relationships may exist, for example, A and/or B, may be expressed as: only A exists, both A and B exist, and only B exists. In addition, the character "I" in the present application generally indicates that the associated objects before and after the character are in a relationship of "or".

In the embodiments of the present application, the same reference numerals denote the same components, and for the sake of brevity, the detailed description of the same components is omitted in different embodiments. It should be understood that the dimensions, such as thickness, length and width, of the various components in the embodiments of the present application illustrated in the accompanying drawings, as well as the dimensions, such as an overall thickness, length and width, of an integrated apparatus are merely illustrative and should not be construed to limit the present application in any way.

"A plurality of" appearing in the present application means two or more (including two).

In the present application, a battery cell may include a lithium-ion secondary battery, a lithium-ion primary battery, a lithium-sulfur battery, a sodium/lithium-ion battery, a sodium-ion battery or a magnesium-ion battery, etc., which is not limited by the embodiments of the present application. The battery cell may be cylindrical, flat, cuboid or in another shape, which will also not be limited in the embodiments of the present application. The battery cells are generally classified into three types depending on the way of package: cylindrical battery cells, prismatic battery cells and pouch battery cells, which also will not be limited in the embodiments of the present application.

A battery mentioned in the embodiments of the present application refers to a single physical module comprising one or more battery cells to provide a high voltage and capacity. For example, the battery mentioned in the present application may include a battery module, a battery pack, etc. The battery generally comprises a case for packaging one or more battery cells. The case can prevent liquid or other foreign matters from affecting charging or discharging of a battery cell.

The battery cell comprises an electrode assembly and an electrolyte. The electrode assembly is composed of a positive electrode plate, a negative electrode plate and a separator. The battery cell operates mainly by relying on movements of metal ions between the positive electrode plate and the negative electrode plate. The positive electrode plate comprises a positive electrode current collector and a positive electrode active material layer. A surface of the positive electrode current collector is coated with the positive electrode active material layer, the positive electrode current collector not coated with the positive electrode active material layer protrudes from the positive electrode current collector coated with the positive electrode active material layer, and the positive electrode current collector not coated with the positive electrode active material layer serves as a positive tab. Taking a lithium-ion battery as an example, the material of the positive electrode current collector may be aluminum, and the positive electrode active material may be lithium cobalt oxides, lithium iron phosphate, ternary lithium or lithium manganate, etc. The negative electrode plate comprises a negative electrode current collector and a negative electrode active material layer. A surface of the negative electrode current collector is coated with the negative electrode active material layer, the negative electrode current collector not coated with the negative electrode active material layer protrudes from the negative electrode current collector coated with the negative electrode active material layer, and the negative electrode current collector not coated with the negative electrode active material layer serves as a negative tab. The negative electrode current collector may be made of copper, and the negative electrode active material may be carbon, silicon, etc. In order to ensure that no fusing occurs when a large current passes, there are multiple positive tabs stacked together, and there are multiple negative tabs stacked together. The separator may be made of PP (polypropylene), PE (polyethylene), etc. In addition, the electrode assembly may be of a wound structure or a laminated structure, which will not be limited in the embodiments of the present application.

Design factors on many aspects need to be simultaneously considered for the development of the battery technology, such as energy density, cycling life, discharge capacity, charge-discharge rate, and other performance parameters. In addition, the safety of the battery needs to be taken into account.

For the battery cell, in order to ensure safety, a pressure relief structure may be provided on the end cap of the battery cell. For example, a groove is provided on the end cap, so that the position of the end cap where the groove is provided is relatively weak to form a pressure relief zone. When the battery cell is subjected to thermal runaway, the pressure inside the battery cell is released through the pressure relief zone, reducing the risk of explosion or fire of the battery cell, and improving the safety of the battery cell.

The inventors have noticed that under the actual working conditions of the battery cell, the pressure relief zone of the end cap is prone to abnormal opening when the battery cell is not subjected to thermal runaway, affecting the service life of the battery cell.

The inventors have found by researches that, for the end cap, the strength of the pressure relief zone at the edge of the groove is less than that of the pressure relief zone at the corner of the groove. When the end cap is subjected to an impact force, due to the relatively small strength of the pressure relief zone at the edge of the groove, the stress is concentrated at the edge of the groove, resulting in large deformation at the edge of the groove and small deformation at the corner of the groove, in turn resulting in abnormal opening of the pressure relief zone, thereby affecting the service life of the battery cell.

In view of this, the embodiments of the present application provide an end cap, comprising a cap body and a groove. The cap body has a first surface. The groove is provided in the cap body to form a pressure relief zone in a region of the cap body where the groove is provided. The groove is recessed from the first surface in a thickness direction of the cap body, and groove side faces of the groove comprise corner faces at corners of the groove. Each corner face is connected to the first surface via a first chamfer face.

In such an end cap, each corner face is connected to the first surface via a first chamfer face, and the provision of the first chamfer face weakens the strength of the pressure relief zone at the corner of the groove, and equalizes the strength of the pressure relief zone at the corner and an edge of the groove. When the end cap is subjected to an impact force, the deformation of the pressure relief zone at the edge of the groove will not significantly differ from the deformation of the pressure relief zone at the corner of the groove, and the risk of local stress concentration in the pressure relief zone is reduced, so that the pressure relief zone can be well protected, improving the impact resistance of the end cap.

The technical solution described in the embodiments of the present application is applicable to a battery and a power consuming device using the battery.

The power consuming device may be a vehicle, a mobile phone, a portable device, a notebook computer, a ship, a spacecraft, an electric toy, an electric tool, etc. The vehicle may be a fuel vehicle, a gas vehicle or a new-energy vehicle. The new-energy vehicle may be a battery electric vehicle, a hybrid vehicle, an extended-range vehicle, etc. The spacecraft includes an airplane, a rocket, an aerospace plane, a spaceship, etc. The electric toy includes a stationary or mobile electric toy, such as a game machine, an electric toy car, an electric toy ship, and an electric toy airplane. The electric tool includes a metal cutting electric tool, a grinding electric tool, an assembling electric tool, and a railway electric tool, such as an electric drill, an electric grinder, an electric wrench, an electric screwdriver, an electric hammer, an electric impact drill, a concrete vibrator, and an electric planer. The power consuming devices mentioned above are not specially limited in the embodiments of the present application.

For ease of description, an example in which the power consuming device refers to a vehicle is used for description in the following embodiments.

Referring to FIG. 1, FIG. 1 is a schematic structural diagram of a vehicle 1000 according to some embodiments of the present application. A battery 100 is provided inside the vehicle 1000, and the battery 100 may be provided at the bottom, the front or the back of the vehicle 1000. The battery 100 may be configured to supply power to the vehicle 1000. For example, the battery 100 may be used as a power supply for operating the vehicle 1000.

The vehicle 1000 may further comprise a controller 200 and a motor 300. The controller 200 is configured to control the battery 100 to supply power to the motor 300, for example, to meet working power requirements during starting, navigation and traveling of the vehicle 1000.

In some embodiments of the present application, the battery 100 can not only serve as a power supply for operating the vehicle 1000, but also serve as a power supply for driving the vehicle 1000, in place of or partially in place of fuel or natural gas, to provide driving power for the vehicle 1000.

Figure 2:
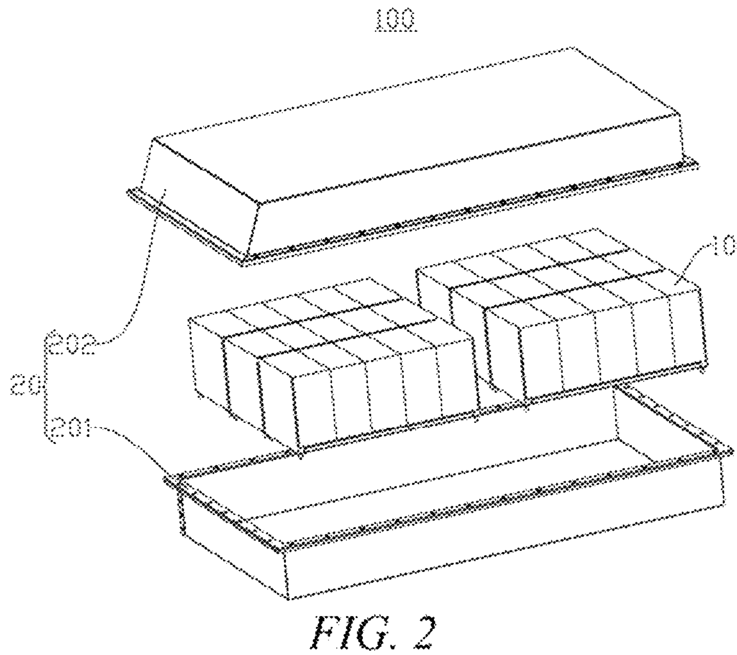
FIG. 2 is an exploded view of a battery provided in some embodiments of the present application.

Referring to FIG. 2, FIG. 2 is an exploded view of a battery 100 provided in some embodiments of the present application. The battery 100 comprises a battery cell 10 and a case 20, and the case 10 is configured to receive the battery cell 20.

The case 20 herein is a component for receiving the battery cell 10, the case 20 provides a receiving space for the battery cell 10, and the case 20 may be of various structures. In some embodiments, the case 20 may comprise a first part 201 and a second part 202. The first part 201 and the second part 202 cover each other to define the receiving space for receiving the battery cell 10. The first part 201 and the second part 202 may have various shapes such as a cuboid and a cylinder. The first part 201 may be of a hollow structure with an open side, the second part 202 may also be of a hollow structure with an open side, and the open side of the second part 202 covers the open side of the first part 201, such that the case 20 having the receiving space is formed. Alternatively, the first part 201 is of a hollow structure with an open side, the second part 202 is of a plate-shaped structure, and the second part 202 covers the open side of the first part 201, such that the case 20 having the receiving space is formed. The first part 201 and the second part 202 may be sealed by means of a sealing element, which may be a sealing ring, a sealant, etc.

In the battery 100, one or more battery cells 10 may be provided. If a plurality of battery cells 10 are provided, the plurality of battery cells 10 may be connected in series, in parallel, or in series-parallel. The series-parallel connection refers that some of the plurality of battery cells 10 are connected in series and the rest are connected in parallel. It is possible that a plurality of battery cells 10 are first connected in series or in parallel or in series-parallel to form a battery module, and a plurality of battery modules are then connected in series or in parallel or in series-parallel connection to form a whole and are received in the case 20. It is also possible that all the battery cells 10 are directly connected in series, or in parallel, or in series-parallel, and the unit composed of all the battery cells 10 is then received in the case 20.

In some embodiments, the battery 100 may further comprise a busbar component, and the plurality of battery cells 10 may be electrically connected by means of the busbar component, so as to implement series connection, parallel connection, or series-parallel connection of the plurality of battery cells 10. The busbar component may be a metal conductor such as a copper conductor, an iron conductor, an aluminum conductor, a stainless steel conductor, and an aluminum alloy conductor.

Figure 3:
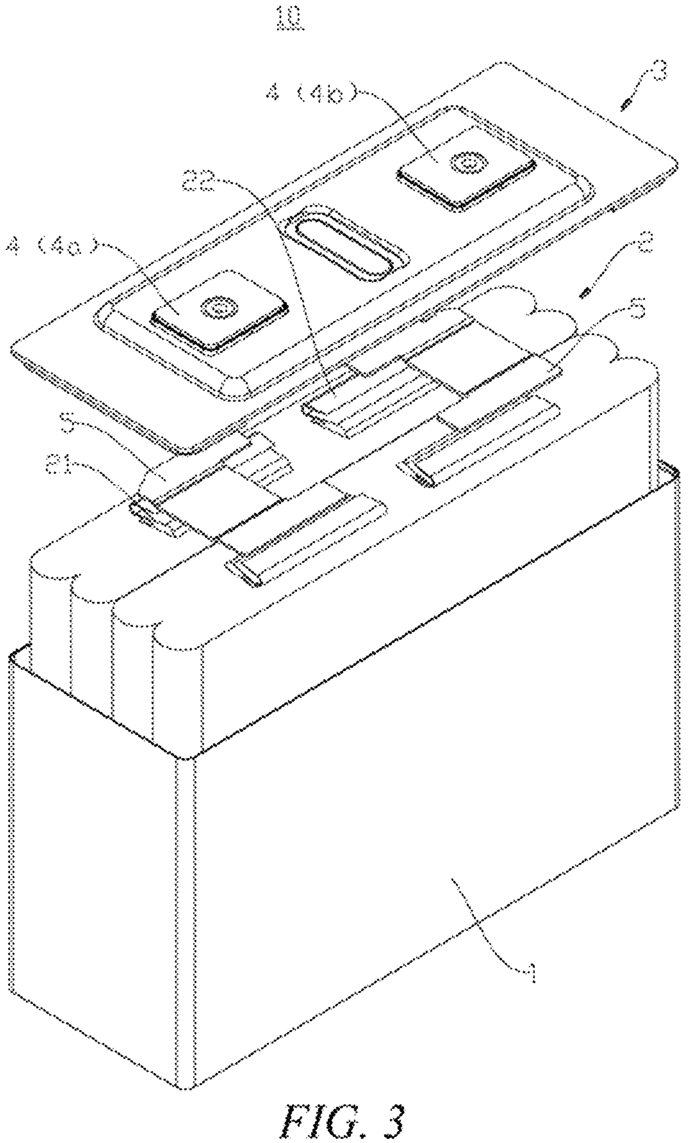
FIG. 3 is an exploded view of a battery cell according to some embodiments of the present application.

Referring to FIG. 3, FIG. 3 is an exploded view of the battery cell 10 provided in some embodiments of the present application. The battery cell 10 comprises a housing 1, an electrode assembly 2, an end cap 3, electrode terminals 4, and current collecting members 5.

The housing 1 is a component for receiving the electrode assembly 2, and the housing 1 may be of a hollow structure having an opening formed at one end, or the housing 1 may be of a hollow structure having openings formed at two opposite ends. The housing 1 may have various shapes such as a cylinder and a cuboid. The housing 1 may be made of various materials, such as copper, iron, aluminum, steel, and aluminum alloy.

The electrode assembly 2 is a component, where an electrochemical reaction occurs, in the battery cell 10. The electrode assembly 2 may comprise a positive electrode plate, a negative electrode plate, and a separator. The electrode assembly 2 may be of a winding structure formed by winding the positive electrode plate, the separator and the negative electrode plate, or a laminated structure formed by laminating the positive electrode plate, the separator and the negative electrode plate. The electrode assembly 2 is provided with a positive tab 21 and a negative tab 22. The positive tab 21 may be a part of the positive electrode plate that is not coated with the positive electrode active material layer, and the negative tab 22 may be a part of the negative electrode plate that is not coated with the negative electrode active material layer.

The end cap 3 is a component that closes an opening of the housing 1 to isolate an internal environment of the battery cell 10 from an external environment. The end cap 3 and the housing 1 together define a sealed space for receiving the electrode assembly 2, the electrolyte and other components. The end cap 3 may be shaped to adapt to the shape of the housing 1. For example, the housing 1 is of a cuboid structure, and the end cap 3 is of a rectangular structure adapted to the housing 1. The end cap 3 may also be made of various materials, such as copper, iron, aluminum, steel, and aluminum alloy. The end cap 3 may be fixed to the housing 1 by welding.

In the battery cell 10, there may be one or two end caps 3. If the housing 1 is of a hollow structure with an opening formed at one end, one end cap 3 may be provided correspondingly. If the housing 1 is of a hollow structure with openings formed at two ends, two end caps 3 may be provided correspondingly, and the two end caps 3 respectively close the two openings of the housing 1.

The electrode terminals 4 are components of the battery cell 10 that are connected to other components to output electric energy of the battery cell 10. The electrode terminals 4 are arranged on the end cap 3, and the electrode terminals 4 are configured to be respectively electrically connected to the positive tab 21 and the negative tab 22 of the electrode assembly 2. In the battery cell 10, two electrode terminals 4 may be provided. The two electrode terminals 4 are respectively a positive electrode terminal **4*a* and a negative electrode terminal 4*b*. The positive electrode terminal 4*a* is configured to be electrically connected to the positive tab 21, and the negative electrode terminal 4*b* is configured to be electrically connected to the negative tab 22. In an embodiment in which there are two end caps 3 in the battery cell 10, the positive electrode terminal 4*a* and the negative electrode terminal 4*b* may be arranged on the same end cap 3, or the positive electrode terminal 4*a* and the negative electrode terminal 4*b* may be respectively arranged on the two end caps 3. As shown in FIG. 3, in an embodiment where there is one end cap 3 in the battery cell 10, the positive electrode terminal 4*a* and the negative electrode terminal 4*b* may be arranged on the same end cap 3**.

The current collecting members 5 are components for enabling the electrical connection between the tabs and the electrode terminals 4. As shown in FIG. 3, taking the example that one end cap 3 is provided in the battery cell 10, and the positive electrode terminal **4*a* and the negative electrode terminal 4*b* are both arranged on the end cap 3, the positive electrode terminal 4*a* may be connected to the positive tab 21 via one of the current collecting members 5, and the negative electrode terminal 4*b* may be connected to the negative tab 22 via the other current collecting member 5**.

Figure 4:
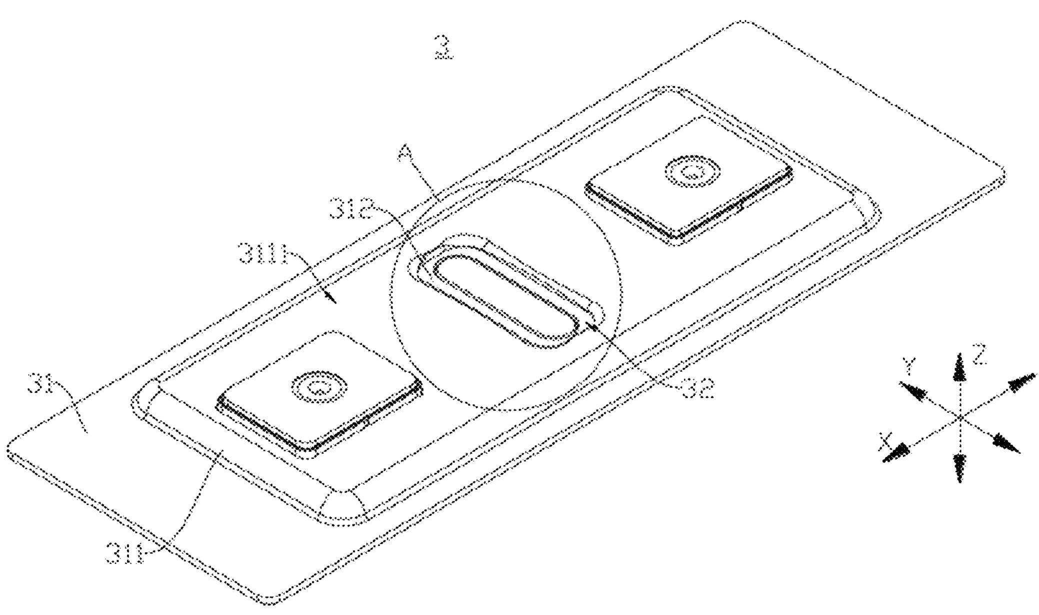
FIG. 4 is a schematic structural diagram of an end cap provided in some embodiments of the present application.
Figure 5:
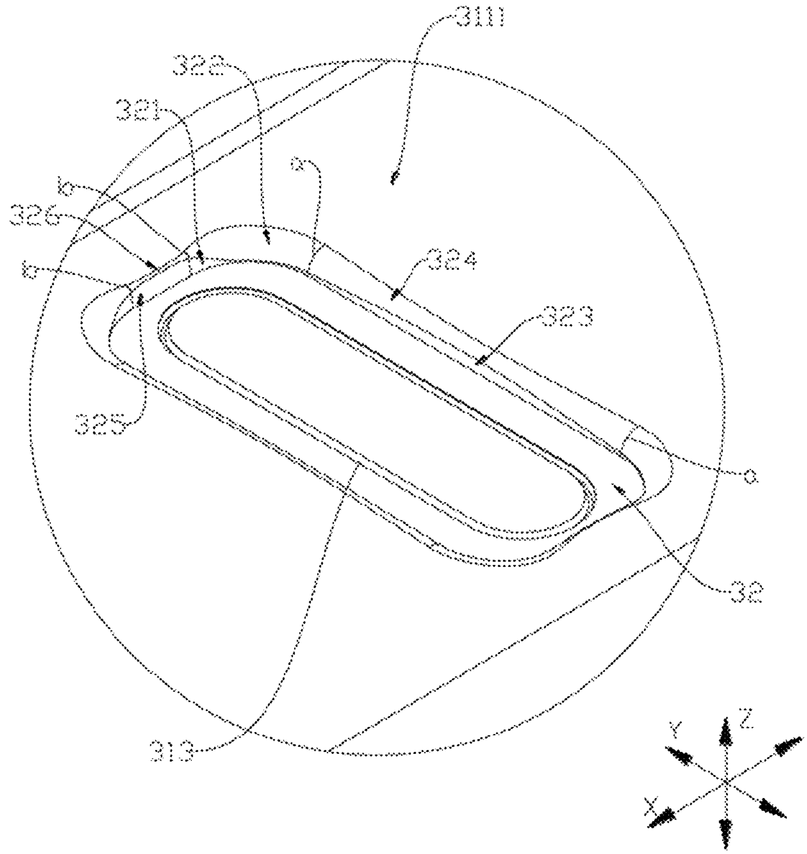
FIG. 5 is a partial enlarged view of part A of the end cap shown in FIG. 4.

Referring to FIGS. 4 and 5, FIG. 4 is a schematic structural diagram of an end cap 3 provided in some embodiments of the present application; and FIG. 5 is a partial enlarged view of part A of the end cap 3 shown in FIG. 4. The embodiments of the present application provide an end cap 3, comprising a cap body 31 and a groove 32. The cap body 31 has a first surface 3111. The groove 32 is provided in the cap body 31 to form a pressure relief zone 312 in a region of the cap body 31 where the groove 32 is provided. The groove 32 is recessed from the first surface 3111 in a thickness direction Z of the cap body 31, and groove side faces of the groove 32 comprise corner faces 321 at corners of the groove 32. Each corner face 321 is connected to the first surface 3111 via a first chamfer face 322.

The cap body 31 is configured to be connected to the housing 1 (shown in FIG. 3), so that the end cap 3 closes the opening of the housing 1. The cap body 31 may be fixed to the end cap 3 by welding. Illustratively, the cap body 31 is of a rectangular structure.

The first surface 3111 may be the outermost surface of the cap body 31 in the thickness direction Z, that is, the outermost surface of the cap body 31 facing away from the housing 1. For example, the cap body 31 is of a flat plate structure, and the first surface 3111 may be the outer surface of the cap body 31 facing away from the casing 1 in the thickness direction Z. For another example, as shown in FIG. 4, the cap body 31 partially protrudes away from the housing 1 in its thickness direction Z to form a boss 311, and the first surface 3111 may be the outer surface of the boss 311 facing away from the housing 1 in the thickness direction Z of the cap body 31. The cap body 31 forms a recessed space at a position corresponding to the protrusion on the side facing the housing 1, and the recessed space can receive components, such as the current collecting members 5 and the tabs of the electrode assembly 2, inside the battery cell 10, so that the energy density of the battery cell is increased. In addition, such a structure can also increase the bending strength of the cap body 31 and improve the impact resistance of the end cap 3.

The groove 32 may be formed in a variety of ways, such as stamping and milling. The groove 32 may have various shapes, such as rectangle, parallelogram, and trapezoid. Illustratively, in FIGS. 5, the groove 32 is substantially rectangular.

The groove side faces of the groove 32 are peripheral faces of the groove 32, surround the groove 32 and are distributed along an opening formed in the first surface 3111. The groove side faces of the groove 32 and a groove bottom face of the groove 32 jointly define an inner space of the groove 32. Taking a substantially rectangular groove 32 as an example, the groove side faces of the groove 32 has four sides located in different orientations, the four side faces are respectively located on four sides of the rectangle, and two adjacent side faces are connected to each other via a corner face 321. The corner faces 321 correspond to corners of the groove 32, and the side faces correspond to edges of the groove 32.

The pressure relief zone 312 is the part of the cap body 31 corresponding to the groove 32. That is to say, after the groove 32 is provided in the cap body 31, the remaining part of the cap body 31 at the position of the groove 32 is the pressure relief zone 312. The pressure relief zone 312 is weaker than other regions of the cap body 31. The pressure relief zone 312 is a pressure relief part of the end cap 3. When the pressure inside the battery cell reaches an explosion pressure, the pressure relief zone 312 may be opened by means of partial rupture, partial or whole falling-off, etc., to form a passage for emissions to flow out of the battery cell 10, so as to achieve the purpose of pressure relief.

The corner face 321 is the part of the groove side face that is located at the corner of the groove 32. The corner face 321 may be an arc-shaped face, and the centerline of the arc-shaped face may extend in the thickness direction Z of the cap body 31. Taking a substantially rectangular groove 32 as an example, the groove 32 has four side faces in different orientations, and two adjacent side faces are connected to each other via a corner face 321, so that two adjacent side faces are smoothly transitioned to each other via the corner face 321.

The first chamfer face 322 is connected to the corner face 321 and the first surface 3111 to realize a smooth transition between the corner face 321 and the first surface 3111. The first chamfer face 322 extends along an arc-shaped trajectory where the corner face 321 is located, and the first chamfer face 322 has an arc-shaped cross-section. The first chamfer face 322 may be of a variable radius structure, that is, the radius of the first chamfer face 322 changes in an extension direction of the first chamfer face 322; or the first chamfer face 322 may be of a constant radius structure, that is, the radius of the first chamfer face 322 does not change in the extension direction of the first chamfer face 322.

In an embodiment of the present application, each corner face 321 is connected to the first surface 3111 via a first chamfer face 322, and the provision of the first chamfer face 322 weakens the strength of the pressure relief zone 312 at the corner of the groove 32, equalizes the strength of the pressure relief zone 312 at the corner and the edge of the groove 32, and reduces the risk of local stress concentration in the pressure relief zone 312, so that the pressure relief zone 312 can be well protected, improving the impact resistance of the end cap 3.

In some embodiments, still referring to FIG. 5, in a circumferential direction of the groove 32, the first chamfer face 322 has a radius gradually increasing from two ends to the middle.

The circumferential direction of the groove 32 is the extension direction of the groove side faces of the groove 32. The two ends of the first chamfer face 322 in the circumferential direction of the groove 32 are the two ends of the first chamfer face 322 in the extension direction. The extension direction of the first chamfer face 322 is consistent with the extension direction of the arc-shaped trajectory where the corner face 321 is located. The radii at the two ends of the first chamfer face 322 may be equal or unequal.

It can be understood that, in this embodiment, the first chamfer face 322 is of a variable radius structure. The radius of the first chamfer face 322 gradually increases from the two ends to the middle, the cap body 31 has a smaller thickness at the middle of the first chamfer face 322 and a larger thickness at the two ends of the first chamfer face 322, and the thickness of the cap body 31 at the position of the first chamfer face 322 gradually decreases from the two ends to the middle of the first chamfer face 322, so that the strength of the pressure relief zone 312 at the corner of the groove 32 gradually increases from the middle to the two ends of the first chamfer face 322.

In some embodiments, the maximum radius of the first chamfer face 322 is $R_1$, which satisfies: 0.5 mm≤$R_1$≤2 mm.

In an embodiment in which the first chamfer face 322 is of a constant radius structure, the radius of the first chamfer face 322 at any position in its extension direction is $R_1$. In an embodiment in which the first chamfer face 322 is of a variable radius structure, taking the example that the radius of the first chamfer face 322 gradually increases from the two ends to the middle, the radius at the middle of the first chamfer face 322 is $R_1$.

In some embodiments, still referring to FIG. 5, the groove side faces further comprise a first side face 323 connected to the corner face 321. The first side face 323 is connected to the first surface 3111 via a second chamfer face 324. The maximum radius of the second chamfer face 324 is smaller than that of the first chamfer face 322.

The first side face 323 is one side face among the groove side faces, taking a rectangular groove 32 as an example, the first side face 323 is a plane, and the first side face 323 may be either a side face extending in the length direction among the groove side faces, or a side face extending in the width direction among the groove side faces.

The second chamfer face 324 is connected to the first side face 323 and the first surface 3111 to realize a smooth transition between the first side face 323 and the first surface 3111. The second chamfer face 324 extends in the extension direction of the first side face 323, and the second chamfer face 324 has an arc-shaped cross-section. The second chamfer face 324 may be of a variable radius structure, that is, the radius of the second chamfer face 324 changes in an extension direction of the second chamfer face 324; or the second chamfer face 324 may be of a constant radius structure, that is, the radius of the second chamfer face 324 does not change in the extension direction of the second chamfer face 324. In an embodiment in which the second chamfer face 324 is of a constant radius structure, the radius of the second chamfer face 324 at any position in its extension direction is equal to the maximum radius of the second chamfer face 324.

In this embodiment, the provision of the second chamfer face 324 enables the first side face 323 to transition to the first surface 3111 more smoothly, preventing the first side face 323 from being directly connected to the first surface 3111 to form a sharp angle. The maximum radius of the second chamfer face 324 being less than that of the first chamfer face 322 enables the strength of the pressure relief zone 312 at the corner and the edge of the groove 32 to be equalized.

In some embodiments, still referring to FIG. 5, in the circumferential direction of the groove 32, two ends of the second chamfer face 324 are connected to the first chamfer faces 322, and the second chamfer face 324 has a radius gradually decreasing from the two ends to the middle.

The two ends of the second chamfer face 324 in the circumferential direction of the groove 32 are the two ends of the second chamfer face 324 in the extension direction. The extension direction of the second chamfer face 324 is consistent with the extension direction of the first side face 323. The radii at the two ends of the second chamfer face 324 may be equal or unequal. Illustratively, in FIG. 5, the second chamfer face 324 has the same radius at the two ends.

In the case where the radius of the first chamfer face 322 gradually increases from the two ends to the middle, and the maximum radius of the second chamfer face 324 is smaller than that of the first chamfer face 322, it can be understood that the radii at the two ends of the second chamfer face 324 is smaller than the radius at the middle of the first chamfer face 322.

In this embodiment, the second chamfer face 324 is of a variable radius structure. The radius of the second chamfer face 324 gradually decreases from the two ends to the middle, the cap body 31 has a larger thickness at the middle of the second chamfer face 324 and a smaller thickness at the two ends of the second chamfer face 324, and the thickness of the cap body 31 at the position of the second chamfer face 324 gradually increases from the two ends to the middle of the second chamfer face 324, so that the strength of the pressure relief zone 312 at the edge of the groove 32 gradually increases from the two ends to the middle of the second chamfer face 324, increasing the strength of the pressure relief zone 312 at the middle of the edge of the groove 32 and providing a better impact resistance.

In some embodiments, still referring to FIG. 5, the first chamfer face 322 is connected to the second chamfer face 324 at a first connection position a, and the radius of the first chamfer face 322 at the first connection position a is equal to that of the second chamfer face 324 at the first connection position a.

The first connection position a is the position where the first chamfer face 322 is connected to the second chamfer face 324. In an embodiment in which the two ends of the second chamfer face 324 are connected to the first chamfer faces 322, the two ends of the second chamfer face 324 correspondingly form two first connection positions a.

In this embodiment, the radius of the first chamfer face 322 at the first connection position a is equal to that of the second chamfer face 324 at the first connection position a, so that the first chamfer face 322 can transition to the second chamfer face 324 more gently, and the first chamfer face 322 and the second chamfer face 324 thus can form a continuous chamfer face.

In some embodiments, the maximum radius of the second chamfer face 324 is $R_2$, which satisfies: 0.1 mm≤$R_2$≤0.5 mm.

In an embodiment in which the second chamfer face 324 is of a constant radius structure, the radius of the second chamfer face 324 at any position in its extension direction is Ra. In an embodiment in which the second chamfer face 324 is of a variable radius structure, taking the example that the radius of the second chamfer face 324 gradually decreases from the two ends to the middle, the radius of at least one of the two ends of the second chamfer face 324 is Ra.

In some embodiments, the groove side faces further comprise a second side face 325, the second side face 325 and the first side face 323 are located in different orientations of the groove 32, the second side face 325 is connected to the first side face 323 via the corner face 321, and the second side face 325 is connected to the first surface 3111 via a third chamfer face 326. The maximum radius of the third chamfer face 326 is smaller than that of the first chamfer face 322.

The second side face 325 is one side face among the groove side faces, taking a rectangular groove 32 as an example, the second side face 325 is a plane, and the second side face 325 may be either a side face extending in the length direction among the groove side faces, or a side face extending in the width direction among the groove side faces.

The third chamfer face 326 is connected to the second side face 325 and the first surface 3111 to realize a smooth transition between the second side face 325 and the first surface 3111. The third chamfer face 326 extends in the extension direction of the second side face 325, and the third chamfer face 326 has an arc-shaped cross-section. The third chamfer face 326 may be of a variable radius structure, that is, the radius of the third chamfer face 326 changes in an extension direction of the third chamfer face 326; or the third chamfer face 326 may be of a constant radius structure, that is, the radius of the third chamfer face 326 does not change in the extension direction of the third chamfer face 326. In an embodiment in which the third chamfer face 326 is of a constant radius structure, the radius of the third chamfer face 326 at any position in its extension direction is equal to the maximum radius of the third chamfer face 326.

In this embodiment, the provision of the third chamfer face 326 enables the second side face 325 to transition to the first surface 3111 more smoothly, preventing the second side face 325 from being directly connected to the first surface 3111 to form a sharp angle. The maximum radius of the third chamfer face 326 being less than that of the first chamfer face 322 enables the strength of the pressure relief zone 312 at the corner and the edge of the groove 32 to be equalized.

In some embodiments, still referring to FIG. 5, in the circumferential direction of the groove 32, two ends of the third chamfer face 326 are connected to the first chamfer faces 322, and the third chamfer face 326 has a radius gradually decreasing from the two ends to the middle.

The two ends of the third chamfer face 326 in the circumferential direction of the groove 32 are the two ends of the third chamfer face 326 in the extension direction. The extension direction of the third chamfer face 326 is consistent with the extension direction of the second side face 325. The radii at the two ends of the third chamfer face 326 may be equal or unequal. Illustratively, in FIG. 5, the third chamfer face 326 has the same radius at the two ends.

In the case where the radius of the first chamfer face 322 gradually increases from the two ends to the middle, and the maximum radius of the third chamfer face 326 is smaller than that of the first chamfer face 322, it can be understood that the radii at the two ends of the third chamfer face 326 is smaller than the radius at the middle of the first chamfer face 322.

It can be understood that, in this embodiment, the third chamfer face 326 is of a variable radius structure. The radius of the third chamfer face 326 gradually decreases from the two ends to the middle, the cap body 31 has a larger thickness at the middle of the third chamfer face 326 and a smaller thickness at the two ends of the third chamfer face 326, and the thickness of the cap body 31 at the position of the third chamfer face 326 gradually increases from the two ends to the middle of the third chamfer face 326, so that the strength of the pressure relief zone 312 at the edge of the groove 32 gradually increases from the two ends to the middle of the third chamfer face 326, increasing the strength of the pressure relief zone 312 at the middle of the edge of the groove 32 and providing a better impact resistance.

In some embodiments, still referring to FIG. 5, the first chamfer face 322 is connected to the third chamfer face 326 at a second connection position b, and the radius of the first chamfer face 322 at the second connection position b is equal to that of the third chamfer face 326 at the second connection position b.

The second connection position b is the position where the first chamfer face 322 is connected to the third chamfer face 326. In an embodiment in which the two ends of the third chamfer face 326 are connected to the first chamfer faces 322, the two ends of the third chamfer face 326 correspondingly form two second connection positions b.

In this embodiment, the radius of the first chamfer face 322 at the second connection position b is equal to that of the third chamfer face 326 at the second connection position b, so that the first chamfer face 322 can transition to the third chamfer face 326 more gently, and the first chamfer face 322 and the third chamfer face 326 thus can form a continuous chamfer face.

In some embodiments, the maximum radius of the third chamfer face 326 is $R_3$, which satisfies: 0.1 mm≤$R_3$≤0.5 mm.

In an embodiment in which the third chamfer face 326 is of a constant radius structure, the radius of the third chamfer face 326 at any position in its extension direction is $R_3$. In an embodiment in which the third chamfer face 326 is of a variable radius structure, taking the example that the radius of the third chamfer face 326 gradually decreases from the two ends to the middle, the radius of at least one of the two ends of the third chamfer face 326 is $R_3$.

In some embodiments, still referring to FIG. 5, the groove side faces comprise two first side faces 323 and two second side faces 325, the two first side faces 323 are arranged opposite each other in the first direction X, and the two second side faces 325 are arranged opposite each other in the second direction Y. The first direction X is perpendicular to the second direction Y.

The first direction X and the second direction Y are both perpendicular to the thickness direction Z of the cap body 31.

The two first side faces 323 are both planes and are arranged in parallel to each other, and the two second side faces 325 are both planes and are arranged in parallel to each other.

In this embodiment, the groove side faces are substantially rectangular, and the groove 32 is thus also substantially rectangular, so that the structure is simple and easy to form.

In some embodiments, still referring to FIG. 5, a distance between the two first side faces 323 in the first direction X is a first distance, and a distance between the two second side faces 325 in the second direction Y is a second distance. The first distance is less than the second distance.

The groove 32 is substantially rectangular, the first side faces 323 extend in the length direction of the groove 32, and the second side faces 325 extend in the width direction of the groove 32. It can be understood that, the first direction X is the width direction of the groove 32, the second direction Y is the length direction of the groove 32, the first distance is the width of the groove 32, and the second distance is the length of the groove 32.

Illustratively, the size of the first side face 323 in the length direction of the groove 32 is greater than the size of the second side face 325 in the width direction of the groove 32. The size of the second chamfer face 324 in the length direction of the groove 32 is greater than the size of the third chamfer face 326 in the width direction of the groove 32.

As shown in FIG. 5, in an embodiment in which the radius of the first chamfer face 322 gradually increases from the two ends to the middle, the radius of the second chamfer face 324 gradually decreases from the two ends to the middle, and the radius of the third chamfer face 326 gradually decreases from the two ends to the middle, the radius of the end of the first chamfer face 322 connected to the second chamfer face 324 may be larger than the radius of the end of the first chamfer face 322 connected to the third chamfer face 326.

In this embodiment, the groove 32 is substantially rectangular, and the pressure relief zone 312 is also substantially rectangular, providing a relatively large pressure relief area.

In some embodiments, the first direction X is the length direction of the cap body 31, and the second direction Y is the width direction of the cap body 31.

Illustratively, the cap body 31 is rectangular, the width direction of the groove 32 is consistent with the length direction of the cap body 31, and the length direction of the groove 32 is consistent with the width direction of the cap body 31.

Since the width direction of the groove 32 is consistent with the length direction of the cap body 31, and the length direction of the groove 32 is consistent with the width direction of the cap body 31, the pressure relief zone 312 is more likely to be damaged at the short edge of the groove 32 when the inner side of the end cap 3 is subjected to the pressure inside the battery cell 10, and the pressure relief zone 312 is more likely to be damaged at the long edge of the groove 32 when the outer side of the end cap 3 is subjected to an impact force, so that the pressure relief zone 312 is likely to be damaged in different positions under two different working conditions, increasing the impact resistance of the end cap 3 and prolonging the service life of the battery cell 10.

In some embodiments, still referring to FIG. 5, the cap body 31 is provided with a pressure relief indentation 313. The pressure relief indentation 313 is located in the pressure relief zone 312.

The pressure relief indentation 313 may be provided on the groove bottom face of the groove 32. The pressure relief indentation 313 may be formed in a variety of ways, such as stamping and milling.

The region of the cap body 31 where the pressure relief indentation 313 is provided is weaker, so that the pressure relief zone 312 is split at the position where the pressure relief indentation 313 is provided when the pressure inside the battery cell 10 reaches an explosion pressure, so as to release the pressure from the pressure relief zone 312.

In some embodiments, still referring to FIG. 5, the pressure relief indentation 313 is a closed groove extending along an end-to-end closed trajectory.

The closed trajectory may have various shapes, such as a circle, an ellipse and rectangle. Illustratively, in FIG. 5, the closed trajectory is substantially rectangular, the region defined by the pressure relief indentation 313 is also substantially rectangular, and the length direction of the region defined by the pressure relief indentation 313 is consistent with the length direction of the groove 32.

Illustratively, the area of the region defined by the pressure relief indentation 313 is half of the area of the pressure relief zone 312 or more.

In this embodiment, the pressure relief indentation 313 is a closed groove. When the pressure inside the battery cell 10 reaches the explosion pressure, the pressure relief zone 312 can be separated from the region defined by the pressure relief indentation 313 to form an opening accordingly. The emissions inside the battery cell 10 can be discharged outside through the opening, providing a relatively large pressure relief area and improving the pressure relief efficiency.

In other embodiments, the pressure relief indentation 313 may be a non-closed groove. For example, the pressure relief indentation 313 is linear, U-shaped, or C-shaped.

Figure 6:
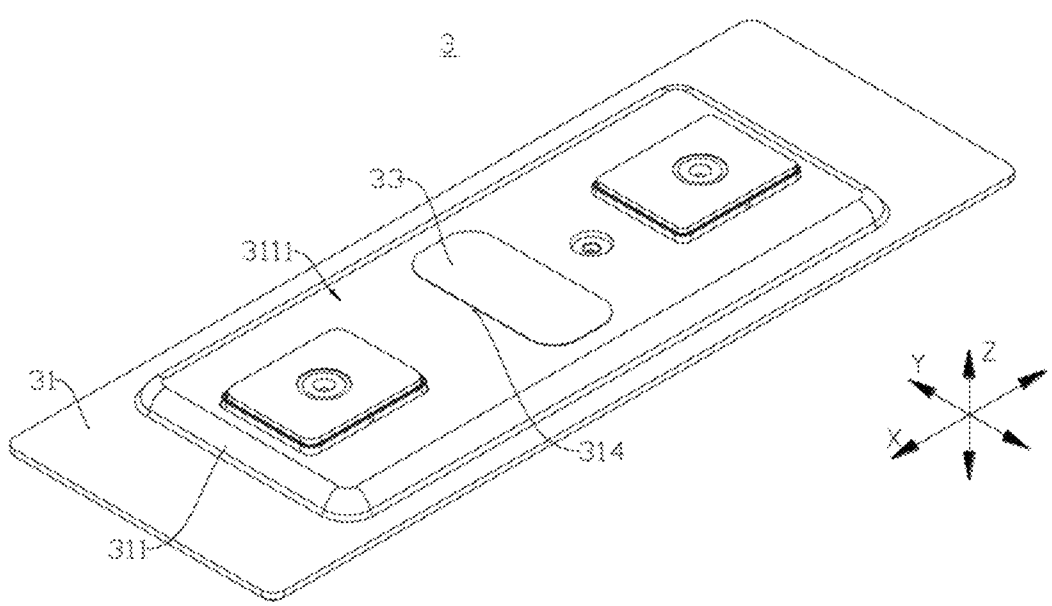
FIG. 6 is a schematic structural diagram of an end cap provided in some other embodiments of the present application.
Figure 7:
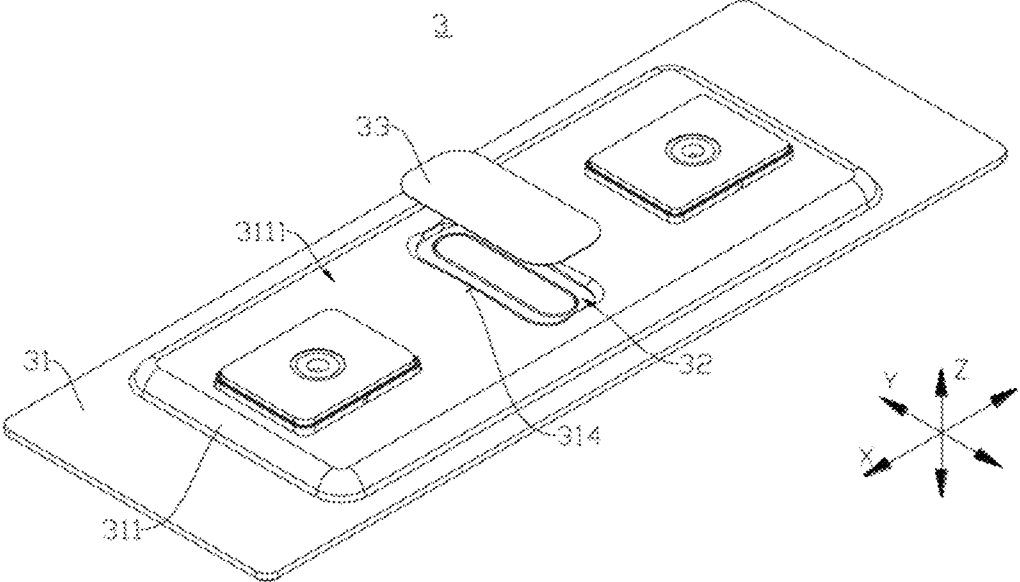
FIG. 7 is an exploded view of the end cap shown in FIG. 6.

In some embodiments, referring to FIGS. 6 and 7, FIG. 6 is a schematic structural diagram of an end cap 3 provided in some other embodiments of the present application, and FIG. 7 is an exploded view of the end cap 3 shown in FIG. 6. The end cap 3 further comprises a protective member 33. The protective member 33 is connected to the cap body 31 and covers the groove 32.

The protective member 33 may be of a sheet-like structure, and the shape of the protective member 33 can be adapted to the shape of the groove 32. For example, the groove 32 is a rectangle, and the protective member 33 is also a rectangle. The protective member 33 may be made of a metal material, such as copper, iron, aluminum, steel, and an aluminum alloy; or the protective member 33 may be made of a non-metal material, such as rubber and plastic. The protective member 33 may be connected to the cap body 31 in various ways, for example, by snap-fitting and bonding.

In this embodiment, the protective member 33 covers the groove 32, and the protective member 33 protects the pressure relief zone 312, reducing the risk of damage to the pressure relief zone 312 by foreign objects.

In some embodiments, still referring to FIGS. 6 and 7, the protective member 33 is connected to the first surface 3111. Illustratively, the protective member 33 is bonded to the first surface 3111.

In an embodiment in which the cap body 31 is provided with a first chamfer face 322, a second chamfer face 324 and a third chamfer face 326, the protective member 33 completely covers the first chamfer face 322, the second chamfer face surface 324 and the third chamfer face 326.

In this embodiment, the protective member 33 is connected to the first surface 3111. Such a structure enables the protective member 33 to be mounted more conveniently. Moreover, the protective member 33 can cover each chamfer face, so as to better protect the pressure relief zone 312.

In some embodiments, still referring to FIGS. 6 and 7, the cap body 31 is provided with an exhaust passage 314. The exhaust passage 314 is in communication with the inside of the groove 32 and the outside of the cap body 31.

The exhaust passage 314 may be a hole provided in the cap body 31. It is possible that one end of the hole penetrates the groove side face of the groove 32, and the other end thereof penetrates the first surface 3111. The exhaust passage 314 may also be a groove provided in the cap body 31. There may be one or more exhaust passages 314 on the cap body 31.

The provision of the exhaust passage 314 makes the inside of the groove 32 communicate with the outside, so as to balance the air pressure inside the groove 32 and the outside, and reduce the risk of the protective member 33 falling off due to the increase of the air pressure inside the groove 32.

Figure 8:
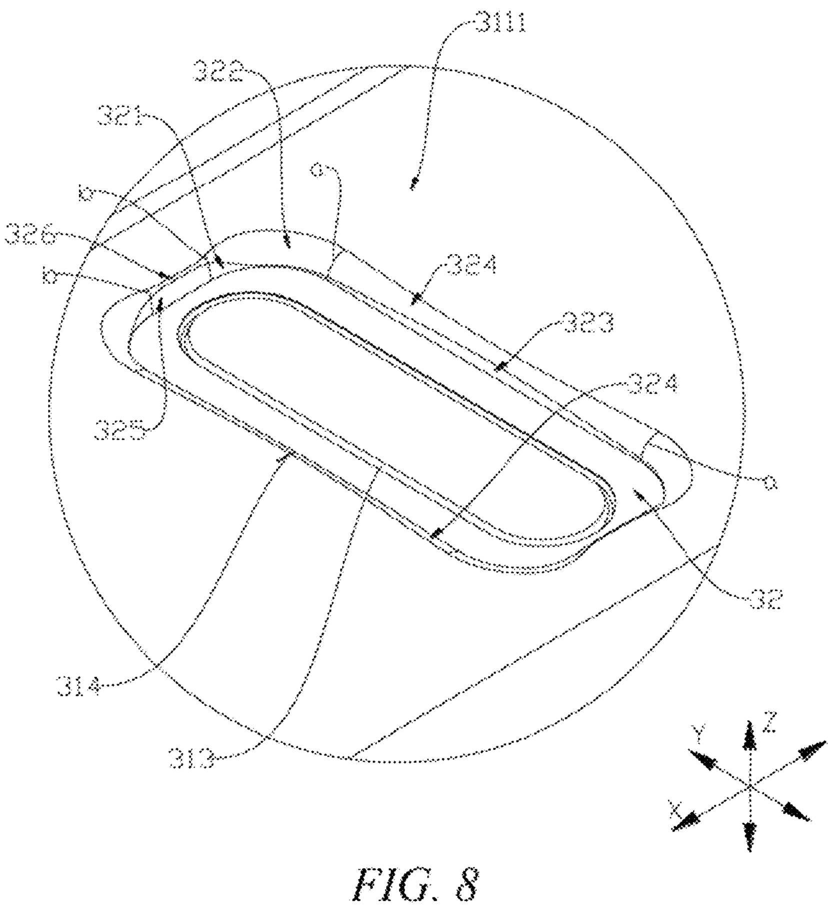
FIG. 8 is a partial enlarged view of the end cap shown in FIG. 6 with a protective member removed.

In some embodiments, referring to FIG. 8, FIG. 8 is a partial enlarged view of the end cap 3 shown in FIG. 6 with the protective member 33 removed, the exhaust passage 314 is an exhaust groove provided in the cap body 31. The exhaust groove penetrates the first surface 3111.

The exhaust groove may be arranged at the edge of the groove 32, for example, the exhaust groove is arranged corresponding to the first side face 323 or the second side face 325 of the groove 32; or the exhaust groove may be arranged at the corner of the groove 32, for example, the exhaust groove is arranged corresponding to the corner face 321 of the groove 32.

Illustratively, in FIG. 8, the exhaust groove is arranged corresponding to the first side face 323, and the exhaust groove extends to the second chamfer face 324.

In this embodiment, the exhaust passage 314 is an exhaust groove provided in the cap body 31, and the exhaust passage 314 can effectively communicate the inside of the groove 32 with the outside, and is easy to form.

The embodiments of the present application provide a battery cell 10, comprising a housing 1 and an end cap 3 provided in any one of the embodiments described above. The housing 1 is provided with an opening, and the cap body 31 closes the opening.

The embodiments of the present application provide a battery 100, comprising a case 20 and a battery cell 10 provided in any one of the embodiments described above. The battery cell 10 is received in the case 20.

In some embodiments, the case 20 has a bottom wall, and the end cap 3 is arranged on the side of the battery cell 10 facing the bottom wall.

The bottom wall is the wall at the bottom of the case 20 in normal use. Take the example that the case 20 comprises a first part 201 and a second part 202, in normal use, the second part 202 covers the top of the first part 201, and the wall of the first part 201 facing away from the second part 202 is the bottom wall.

The end cap 3 is arranged on the side of the battery cell 10 facing the bottom wall, so that the battery cell 10 is in an upside-down state.

The embodiments of the present application further provide a power consuming device, comprising the battery 100 provided in any one of the embodiments described above.

It should be noted that the embodiments in the present application and features in the embodiments may be combined with each other without conflicts.

The above embodiments are only used to explain the technical solutions of the present application, and are not intended to limit the present application, and various modifications and changes of the present application may be made by those skilled in the art. Any modifications, equivalent substitutions, improvements, and the like made within the spirit and principle of the present application should fall within the scope of protection of the present application.

The invention claimed is:

1. An end cap, comprising:

a cap body having a first surface; and a groove provided in the cap body to form a pressure relief zone in a region of the cap body where the groove is provided, the groove being recessed from the first surface in a thickness direction of the cap body, and groove side faces of the groove comprising corner faces at corners of the groove;

wherein each corner face is connected to the first surface via a first chamfer face; and in a circumferential direction of the groove, the first chamfer face includes an arc-shaped cross-section having a radius gradually increasing from two ends to the middle.

2. The end cap according to claim 1, wherein:

the groove side faces further comprise a first side face connected to the corner face, the first side face being connected to the first surface via a second chamfer face; and the maximum radius of the second chamfer face is smaller than that of the first chamfer face.

3. The end cap according to claim 2, wherein:

in the circumferential direction of the groove, two ends of the second chamfer face are connected to the first chamfer faces, and the second chamfer face includes an arc-shaped cross-section having a radius gradually decreasing from the two ends to the middle; and at least one of:

the first chamfer face is connected to the second chamfer face at a first connection position, and the radius of the first chamfer face at the first connection position is equal to that of the second chamfer face at the first connection position; and the maximum radius of the second chamfer face is $R_2$, which satisfies: 0.1 mm≤$R_2$≤0.5 mm.

4. The end cap according to claim 2, wherein;

the groove side faces further comprise a second side face, the second side face and the first side face are located in different orientations of the groove, the second side face is connected to the first side face via the corner face, and the second side face is connected to the first surface via a third chamfer face; and the maximum radius of the third chamfer face is smaller than that of the first chamfer face.

5. The end cap according to claim 4, wherein;

in the circumferential direction of the groove, two ends of the third chamfer face are connected to the first chamfer faces, and the third chamfer face includes an arc-shaped cross-section having a radius gradually decreasing from the two ends to the middle; and at least one of:

the first chamfer face is connected to the third chamfer face at a second connection position, and the radius of the first chamfer face at the second connection position is equal to that of the third chamfer face at the second connection position; and the maximum radius of the third chamfer face is $R_3$, which satisfies: 0.1 mm≤$R_3$≤0.5 mm.

6. The end cap according to claim 4, wherein;

the groove side faces comprise two first side faces and two second side faces, the two first side faces are arranged opposite each other in a first direction, and the two second side faces are arranged opposite each other in a second direction, the first direction being perpendicular to the second direction.

7. The end cap according to claim 6, wherein:

a distance between the two first side faces in the first direction is a first distance, and a distance between the two second side faces in the second direction is a second distance, the first distance being less than the second distance; and the first direction is a length direction of the cap body, and the second direction is a width direction of the cap body.

8. The end cap according to claim 1, wherein:

the cap body is provided with a pressure relief indentation located in the pressure relief zone; and the pressure relief indentation is a closed groove extending along an end-to-end closed trajectory.

9. The end cap according to claim 1, further comprising:

a protective member, wherein the protective member is connected to the cap body and covers the groove.

10. The end cap according to claim 9, wherein:

the protective member is connected to the first surface; and at least one of:

the cap body is provided with an exhaust passage which is in communication with the inside of the groove and the outside of the cap body; and the exhaust passage is an exhaust groove provided in the cap body, the exhaust groove penetrating the first surface.

11. The end cap according to claim 1, wherein:

the maximum radius of the first chamfer face is $R_1$, which satisfies: 0.5 mm≤$R_1$≤2 mm.

12. The end cap according to claim 1, wherein:

the radius of the first chamfer face gradually increasing from the two ends to the middle is a variable radius structure such that the radius of the first chamfer face changes in an extension direction of the first chamfer face.

13. The end cap according to claim 1, wherein:

the first chamfer face, a second chamfer face, and a third chamfer face form a continuous chamfer face between the first surface and the groove, the first chamfer face directly connects the first surface to the groove, a first side face separates the second chamfer face from the groove, and a second side face separates the third chamfer face from the groove.

14. A battery cell, comprising:

a housing provided with an opening;

an end cap, including:

a cap body having a first surface; and a groove provided in the cap body to form a pressure relief zone in a region of the cap body where the groove is provided, the groove being recessed from the first surface in a thickness direction of the cap body, and groove side faces of the groove comprising corner faces at corners of the groove; wherein each corner face is connected to the first surface via a first chamfer face, in a circumferential direction of the groove, the first chamfer face includes an arc-shaped cross-section having a radius gradually increasing from two ends to the middle, and the cap body closes the opening.

15. The battery cell according to claim 14, wherein:

the radius of the first chamfer face gradually increasing from the two ends to the middle is a variable radius structure such that the radius of the first chamfer face changes in an extension direction of the first chamfer face.

16. The battery cell according to claim 14, wherein:

the first chamfer face, a second chamfer face, and a third chamfer face form a continuous chamfer face between the first surface and the groove, the first chamfer face directly connects the first surface to the groove, a first side face separates the second chamfer face from the groove, and a second side face separates the third chamfer face from the groove.

17. A battery, comprising:

a case; and a battery cell, including:

a housing provided with an opening;

an end cap, including:

a cap body having a first surface; and a groove provided in the cap body to form a pressure relief zone in a region of the cap body where the groove is provided, the groove being recessed from the first surface in a thickness direction of the cap body, and groove side faces of the groove comprising corner faces at corners of the groove; wherein each corner face is connected to the first surface via a first chamfer face, in a circumferential direction of the groove, the first chamfer face includes an arc-shaped cross-section having a radius gradually increasing from two ends to the middle, the cap body closes the opening, wherein the battery cell is received in the case, the case has a bottom wall, and the end cap is arranged on the side of the battery cell facing the bottom wall.

18. A power consuming device, comprising:

the battery of claim 17.

19. The battery according to claim 17, wherein:

the radius of the first chamfer face gradually increasing from the two ends to the middle is a variable radius structure such that the radius of the first chamfer face changes in an extension direction of the first chamfer face.

20. The battery according to claim 17, wherein:

the first chamfer face, a second chamfer face, and a third chamfer face form a continuous chamfer face between the first surface and the groove, the first chamfer face directly connects the first surface to the groove, a first side face separates the second chamfer face from the groove, and a second side face separates the third chamfer face from the groove.

* * * * *